United States Patent [19]

Noro et al.

[11] Patent Number: 5,659,473
[45] Date of Patent: Aug. 19, 1997

[54] ELECTRIC POWER STEERING SYSTEM

[75] Inventors: Yoshiki Noro; Shinji Hironaka; Yoshinobu Mukai, all of Wako, Japan

[73] Assignee: Honda Giken Kogyo Kabushiki Kaisha, Tokyo, Japan

[21] Appl. No.: 456,514

[22] Filed: Jun. 1, 1995

[30] Foreign Application Priority Data

Jun. 28, 1994 [JP] Japan .................................. 6-146603
Jul. 19, 1994 [JP] Japan .................................. 6-167192

[51] Int. Cl.$^6$ .................................................. B62D 5/04
[52] U.S. Cl. ........................ 364/424.052; 364/424.051; 180/412; 180/422
[58] Field of Search ................... 364/424.051, 424.052; 180/410, 411, 412, 413, 421, 422; 280/91.1

[56] References Cited

U.S. PATENT DOCUMENTS

| | | | |
|---|---|---|---|
| 4,800,975 | 1/1989 | Oshita et al. | 364/424.05 |
| 4,961,474 | 10/1990 | Daido et al. | 180/79.1 |
| 4,979,114 | 12/1990 | Oshita et al. | 364/424.05 |
| 4,989,682 | 2/1991 | Takahashi et al. | 364/424.05 |
| 5,201,818 | 4/1993 | Nishimoto | 364/424.05 |
| 5,253,725 | 10/1993 | Nishimoto | 364/424.05 |
| 5,467,279 | 11/1995 | Wada et al. | 364/424.05 |
| 5,469,357 | 11/1995 | Nishimoto | 364/424.05 |

*Primary Examiner*—Gary Chin
*Attorney, Agent, or Firm*—Armstrong, Westerman Hattori, McLeland & Naughton

[57] ABSTRACT

An electric power steering system is disclosed which includes an electric motor adapted to supply steering assist directly to the steering system to thereby reduce the steering torque to be exerted to the system by a driver. The steering system includes a phase compensative device which is formed of a phase delay circuit, or the phase delay circuit and a low-pass filter connected in series thereto, and is positioned in a loop connecting a motor current detector in the steering system and a drive controller in a control block, so that high-frequency components may be removed from motor current signals in the feedback loop. As a result, it is possible to suppress lag of the phases of the signals and hence to prevent parasitic oscillations, leading to the steering system being capable of providing steering assist most suited to particular steering operations and comfortable steering feel to a driver.

3 Claims, 5 Drawing Sheets

$$\omega s = \frac{1}{R2 \times C}$$

$$\omega s = \frac{1}{R2 \times C} \qquad \omega c = \frac{1}{R1 \times C1}$$

$\omega_{ca} = \dfrac{1}{RC}$

ELECTRIC POWER STEERING SYSTEM

BACKGROUND OF THE INVENTION

1. Field of the Invention

The present invention relates generally to an electric power steering system having an electric motor adapted to supply power steering assist directly to the steering system to thereby reduce the steering torque to be exerted by a driver, and more particularly to such a steering system in which noises and parasitic oscillations in the steering system are prevented.

2. Description of the Related Art

An electric power steering system is known in which an electric motor is driven by a target current generated based on a steering torque detected by a steering torque sensor and a vehicle velocity detected by a vehicle velocity sensor.

In another known electric power steering system, actual electric current flowing through an electric motor is fed back to a target current so that the deviation between the target current and motor current can be compensated for by means of a proportional plus integral (PI) control, or the deviation and the phase delay in the control system can be compensated for by means of a proportional plus integral plus derivative (PID) control.

Still another electric power steering system is known in which a low-pass filter is provided in a feedback loop of a motor current to attenuate gain in a high-frequency band to thereby eliminate high-frequency components and noises contained in the motor current.

The overall arrangement of a known electric power steering system is shown in FIG. 6, and dominant part of a known electric power steering system is shown in FIG. 7 in a block diagram.

As shown in FIG. 6, the electric power steering system, generally designated by reference numeral 1, includes: a rack-and-pinion mechanism 5 having a steering wheel 2, a steering shaft 3, a hypoid gear 4, a pinion 5A, a rack shaft 5B and so forth; a tie-rod 6; a steerable front wheel 7; an electric motor 8 for providing steering assist; a steering torque sensor 10 for sensing a steering torque to be applied to the steering wheel 2 and converting the sensed value into an electrical output torque signal T; a vehicle velocity sensor 11 for sensing a vehicle velocity and converting the sensed value into an electrical output vehicle velocity signal V; a control block 12 for driving and controlling the electric motor 8 in response to the steering torque signal T and the vehicle velocity signal V; a motor driver 13; and a motor current detector 14 for detecting motor current.

Upon operation of the steering wheel 2, the steering torque sensor 10 disposed on the steering shaft 3 senses a steering torque and converts the same into a corresponding electrical signal, which will then be transmitted to the control block 12 in the form of a steering torque signal T.

The rotational motion of the steering shaft 3 is transformed into a linear motion at the rack-and-pinion mechanism 5 via the pinion 5A in meshing engagement with the rack shaft 5B and is then transmitted through the tie-rod 6 to the front wheel 7 to steer the same.

The vehicle velocity sensor 11 senses a vehicle velocity and generates a corresponding electrical signal to be fed as a vehicle velocity signal V, to the control block 12.

The control block 12 supplies a motor control signal $V_o$ to a motor driver 13 in response to the steering torque signal T and the vehicle velocity signal V. The motor driver 13 drives the electric motor 8 by supplying motor voltage $V_M$ corresponding to the motor control signal $V_o$.

The electric motor 8 driven by the motor voltage $V_M$ supplies steering assist to the steering system through the hypoid gear 4 to thereby reduce the steering torque to be exerted to the steering wheel 2 by a driver.

Motor current $I_M$ which flows through the electric motor 8 corresponds to motor voltage $V_M$ obtained, for example, by pulse width modulation (PWM) techniques.

Referring now to FIG. 7, the control block 12 of the power steering system 1 includes a target current generator 15 which outputs a target current $I_{MS}$ in response to the steering torque signal T detected by the steering torque sensor 10 and the vehicle velocity signal V detected by the vehicle velocity sensor 11.

The target current generator 15 stores data representative of steering torque (T)-target current($I_{MS}$) characteristic where the vehicle velocity V shown in FIG. 8 is a parameter.

The control block 12 also includes a subtracter 16 which performs an operation as to the deviation $\Delta I(=I_{MS}-I_{MO})$ between the target current $I_{MS}$ and feedback current $I_{MO}$ resulted from filtering high-frequency components of the motor current $I_M$.

The control block 12 further includes a drive controller 17 having a proportional plus integral (PI) control which generates a motor control signal $V_o$ for performing a pulse width modulation (PWM) control over the motor driver 13, and a low-pass filter 18 which is disposed in a feedback loop from the motor current detector 14 for removing high-frequency components from detected motor current $I_{MD}$.

The proportional plus integral (PI) control of the drive controller 17 has a proportional element (P) and an integral element (I). The gain G and phase angle θ of their transfer function F (jω) are represented by the Bode diagram of FIG. 10.

Referring to FIG. 10, it is known that there occurs a phase delay (θ=–90°) at areas of low angular frequency ω while the gain G (=20logG) may be improved significantly. By contrast, the gain G (=20logG) is low at areas of high angular frequency ω while the phase delay can be improved significantly.

The low-pass filter 18 may be any primary CR (resistor, condenser) low-pass filter, e.g., the one shown in FIG. 9, which is designed to reduce noises present in high angular frequency components and gains in high-frequency bands, without imparting any influence upon the steering system, by removing high-frequency components at an attenuation rate of 6 dB per octave in the case of frequencies higher than a cutoff angular frequency of ωca {=1/(C×R1)}.

The known electric power steering systems thus arranged have an advantage in that it is possible to significantly improve the gain G at areas of low angular frequency ω and phase delay at areas of high angular frequency ω and to remove noises of high angular frequency. However, the low-pass filter of the systems has an inconvenience such that the phase as the angular frequency becomes higher. Further, in the feedback loop of the control block 12, if the phase turns by 2 π, the resultant loop gain shall be larger than 1, whereby oscillation conditions are met and noises are generated due to parasitic oscillations, thus affecting the steering assist.

One of ordinary skill in the art may consider altering the proportional element for the proportional plus integral control and an integral element coefficient so as to prevent oscillations. However, this may not be an acceptable solution in that where each coefficient is small, the desired steering assist may not always be obtained and in that where a large coefficient is chosen as the proportional element, the focusing of steering characteristic may deteriorate and the steering feel may be adversely affected.

SUMMARY OF THE INVENTION

The invention provides an improved electric power steering system with an electric motor which supplies steering assist directly to the steering system to thereby reduce the steering torque to be exerted by a driver. The system also includes a phase delay circuit, or a phase compensating device having the phase delay circuit and a low-pass filter connected in series thereto, which is disposed in a feedback loop coupling a motor current detector in the steering system and a drive controller in a control block, so that high-frequency components of motor current signals in the feedback loop may be removed, and so that the phase lag of the signals may be suppressed, thus preventing parasitic oscillations.

With the phase delay circuit, or the phase compensating device having the phase delay circuit and the low-pass filter connected in series thereto, being disposed in the feedback loop which couples the motor current detector and the drive controller in the control block, it is possible to reduce undesirable noises in the steering system and hence to prevent parasitic oscillations. As a result, steering assist most suited to steering operations can be obtained and more comfortable steering feel can be provided to an operator of the system.

DETAILED DESCRIPTION

The invention will now be described in more detail with reference to preferred embodiments illustrated in the accompanying drawings.

Figure 1:
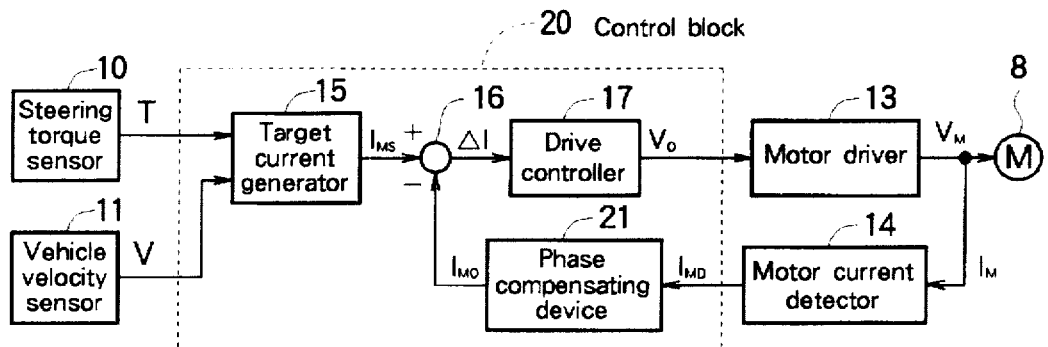
FIG. 1 is a block diagram illustrating a dominant part of a control system of an electrical power steering system according to the present invention.

FIG. 1 is a block diagram illustrating dominant part of a control system of an electrical power steering system according to the present invention.

Figure 7:
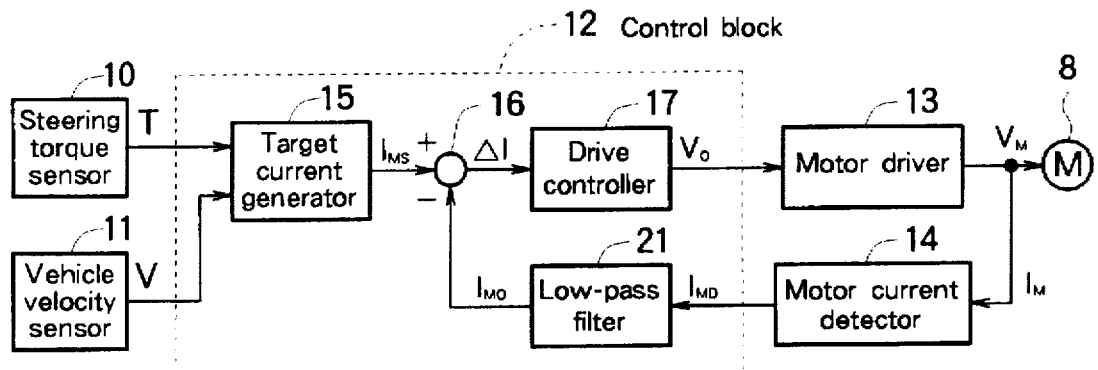
FIG. 7 is a block diagram illustrating dominant part of the known electric power steering system.

As shown in FIG. 1, control block 20 includes a phase compensating device 21 disposed between a motor current detector 14 forming a feedback loop and a subtracter 16, and is different in this respect from the control block shown in FIG. 7.

The control block 20 also includes a microprocessor, serving as a basic component, a target current generator 15, a subtracter 16, a drive controller 17 and a phase compensating device 21.

Figure 8:
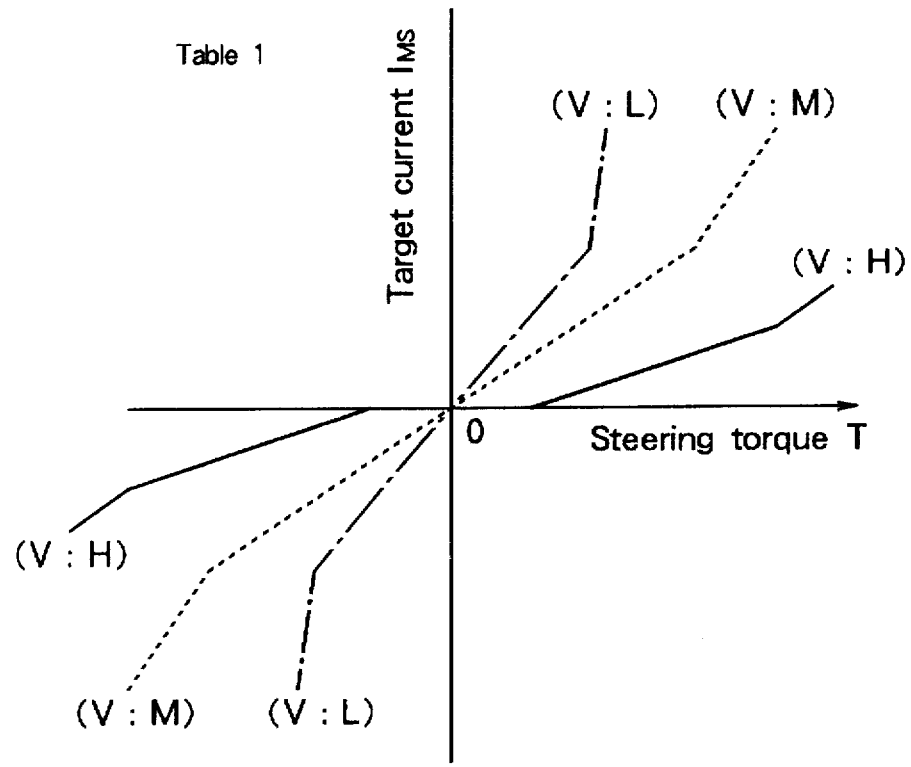
FIG. 8 is a graphical representation of the steering torque (T)-command current($I_{MS}$) characteristic where vehicle velocity signal V is a parameter.
Figure 9:
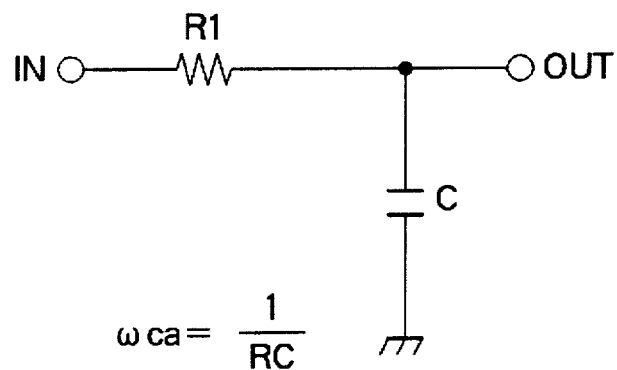
FIG. 9 is a circuit diagram of a primary CR (condenser, resistor) low-pass filter.

From steering torque(T)-target current($I_{MS}$) characteristic (see Table 1 in FIG. 8) with vehicle velocity signal V as a parameter, determined based on model values or experimental values and stored in such a memory as ROM, the target current generator 15 selects target current I representative of steering torque (T) and vehicle velocity (V) and outputs it from a plus (+) terminal of the subtracter 16.

Figure 10:
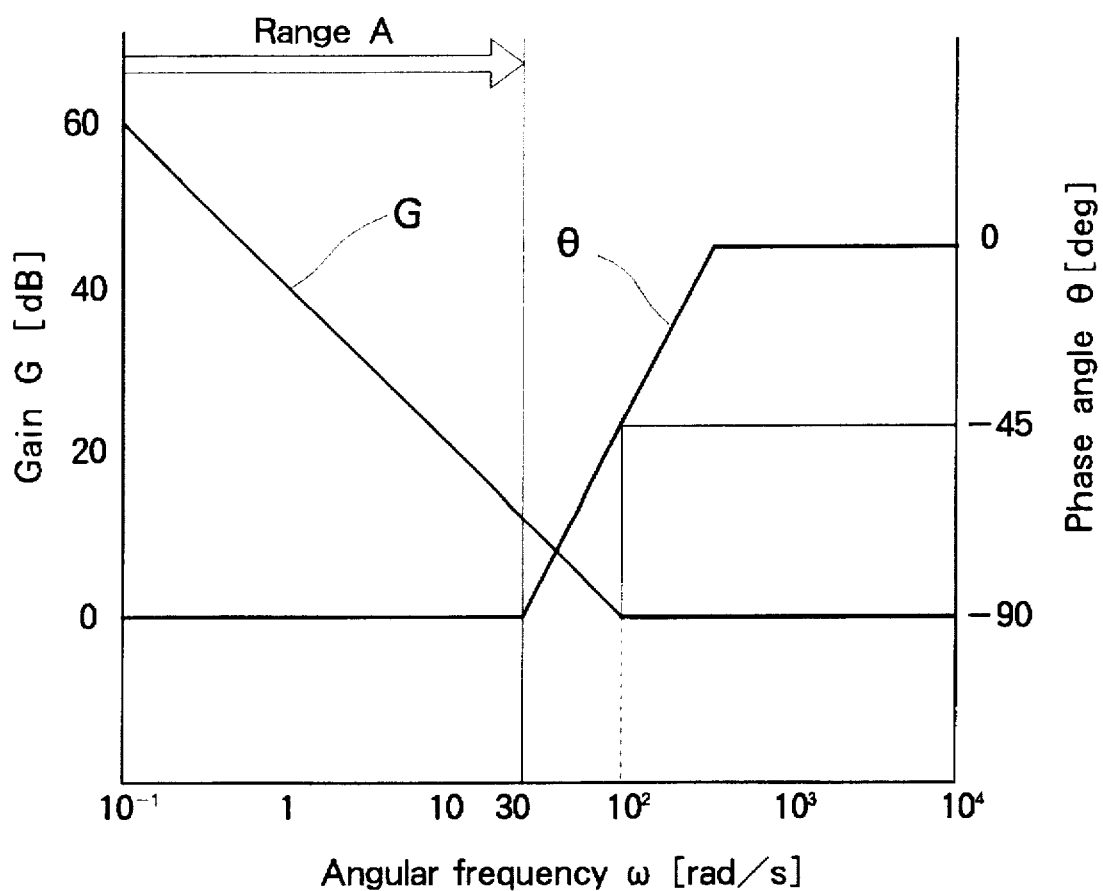
FIG. 10 is a Bode diagram of a proportional plus integral (PI) control.

The drive controller 17 has a proportional plus integral (PI) control which performs proportional and integral compensation operations with respect to the deviation between $\Delta I(=I_{Ms}-I_{MO})$ between the target current I fed from the subtracter 16 and feedback current I, whereafter it outputs motor control signal $V_o$ (e.g., PWM signal) having gain G and phase angle θ relative to angular frequency ω shown in the bode diagram of FIG. 10 so as to control motor driver 13.

Accordingly, in the proportional plus integral (PI) control, the phase angle θ may be delayed to –90° (phase turn occurs) at such areas of low angular frequencies as steering range while the gain G may be improved significantly. By contrast, the gain G (20 logG) may be low at areas of high angular frequencies ω while the phase delay may be improved significantly.

However, in case where the deviation ΔI is amplified by use of an amplifier in which an inverse phase (phase difference of –180°) occurs between an input and output of the drive controller 17, a phase difference (–90° at maximum) of the proportional plus integral (PI) control is summed up to the phase difference (–180°)of the amplifier and the phase difference between the deviation ΔI of the subtracter 16 and motor control voltage $V_o$ will thus be –270° at maximum.

In this condition, the phase difference of the feedback loop of the control block 20 will be –90° at given angular frequency ωa, and the gross loop gain $G_L$ of the control block 20 will become larger than 1 ($G_L \geq 1$), whereby oscillation conditions are met, thus causing parasitic oscillations to occur at given angular frequency ωa.

The motor driver 13 and the motor current detector 14 are arranged such that the phase difference between their input and output becomes 0. The phase compensating device 21 is designed to provide a phase difference (phase turn) less than –90°, preferably sufficiently less than –90°. Also, the phase compensating device 21 is positioned in the loop between the motor current detector 14 and the subtracter 16 so that the phase of the entire loop of the control block 20 does not satisfy the oscillation conditions.

Figure 2:
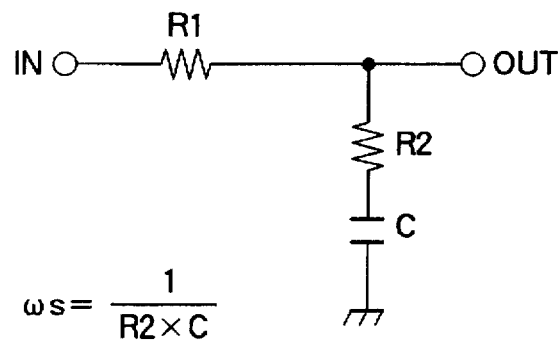
FIG. 2 is a circuit diagram of a phase compensating device employing a phase delay circuit of the electric power steering system according to the invention.

Referring now to FIG. 2, there is shown a circuit diagram of the phase compensating device having a phase delay circuit of the electric power steering system according to the invention.

As shown in FIG. 2, the phase delay circuit includes a resistor R1, a resistor R2 and a condenser C. As a result, it is rendered capable of achieving the attenuation level of 20log (R1/R2) at angular frequency of ωs=1/(C×R2), rendering maximum phase difference (phase turn) between detected motor current IMD and feedback current IMO to be sufficiently lower than –90°.

Figure 3:
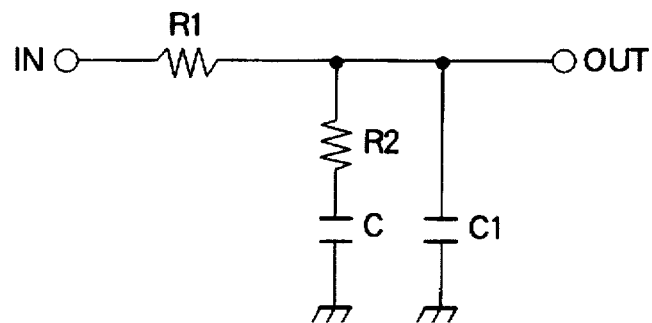
FIG. 3 is a circuit diagram of the phase compensating device formed of the phase delay circuit and a low-pass filter, of the electric power steering system according to the invention.

Reference is now made to FIG. 3 illustrating a circuit schematic of a phase compensating device formed of a phase delay circuit plus low-pass filter according to the invention.

In FIG. 3, the resistor R1, resistor R2 and condenser C together form the phase delay circuit. Likewise, the resistor R1 and condenser C1 together form a primary CR low-pass filter.

At angular frequencies of $\omega s = 1/(C \times R2)$, the phase delay circuit provides the attenuation level and phase difference (phase turn) characteristics similar to those shown in FIG. 2. The low-pass filter cuts off angular frequencies of $\omega c = 1/(C \times R1)$ and has the characteristics of achieving the attenuation level of 6 dB per octave at angular frequencies over $\omega c$ and of providing a normal phase difference which approximates to $-90°$ in correspondence with increase of the angular frequency $\omega$.

In both of the circuits for the phase delay circuit shown in FIG. 2 and the phase delay circuit plus low-pass filter shown in FIG. 3, the impedance (output impedance of the motor current detector 14 of FIG. 1) as viewed from the output (IN terminal) side is determined to be small (preferably as close to 0 as possible), and the impedance (input impedance of subtracter 16 shown in FIG. 1) as viewed from the output (OUT terminal) side is determined to be large (preferably as close to infinity as possible).

It should also be understood that the low-pass filter shown in FIG. 3 may not necessarily be the primary, passive low-pass filter of the embodiment. Instead, filters of higher order or active low-pass filters may also be used.

Figure 4:
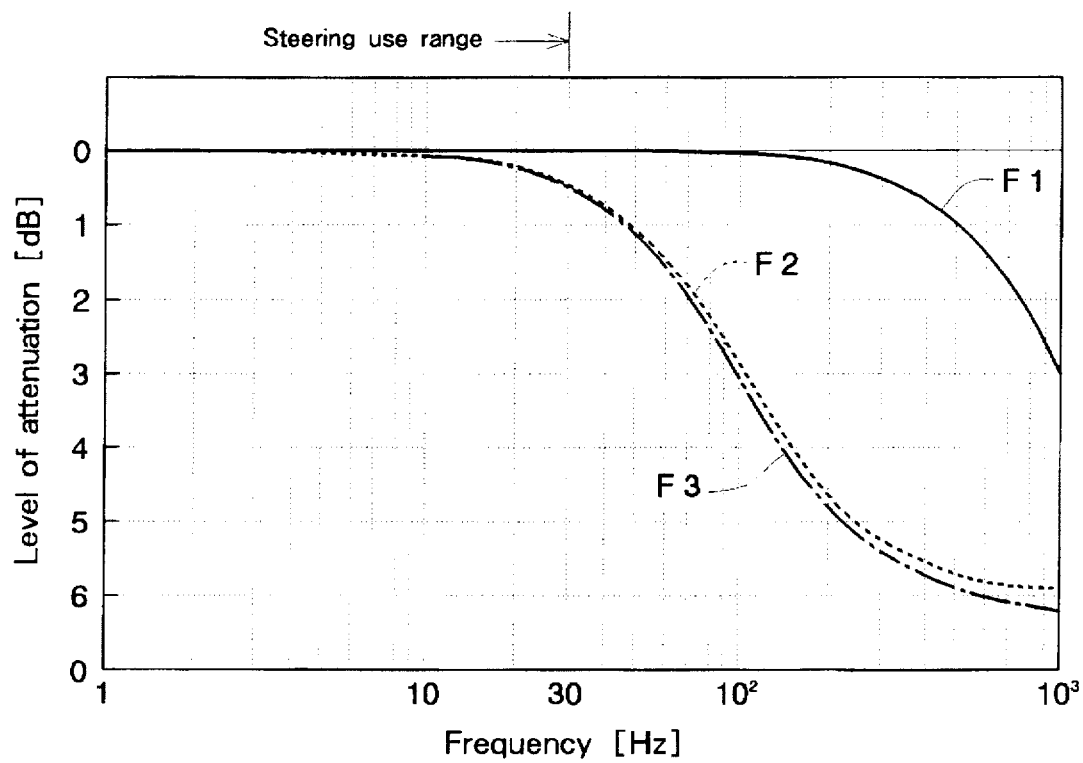
FIG. 4 is a graph showing the attenuation characteristic of the phase compensating device shown in FIG. 2 and FIG. 3.
Figure 5:
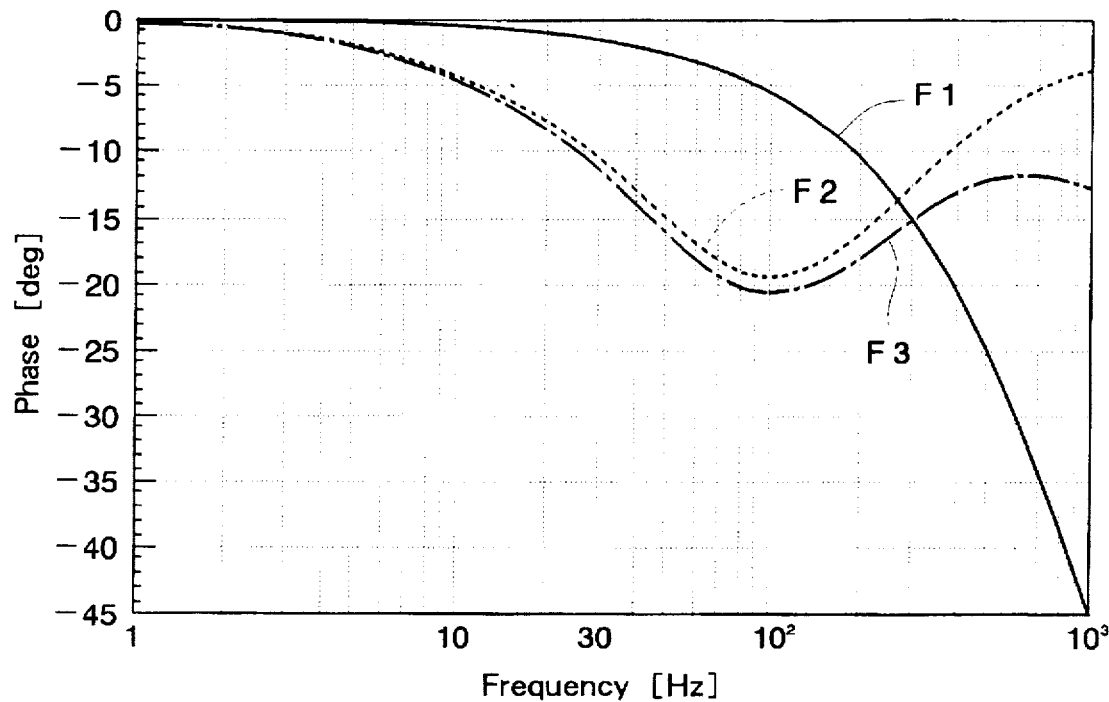
FIG. 5 is a graph showing the phase characteristic of the phase compensating device shown in FIG. 2 and FIG. 3.
Figure 6:
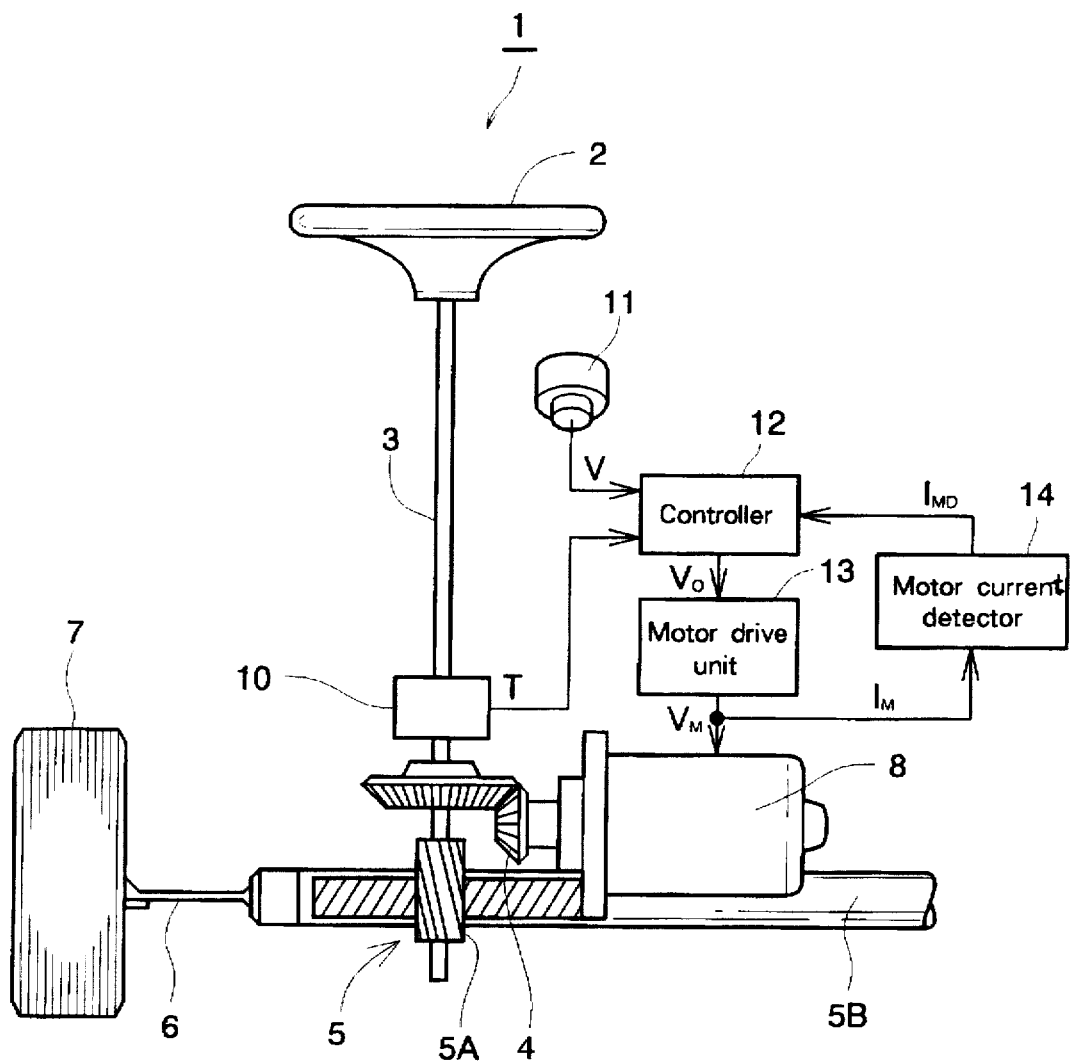
FIG. 6 is a schematic view illustrating the overall arrangement of a known electric power steering system.

Reference is now made to FIG. 4 illustrating the attenuation characteristic of a phase compensating device corresponding to those of FIG. 2 and FIG. 3, as well as to FIG. 5 illustrating the phase characteristic of a phase compensating device corresponding to those of FIG. 2 and FIG. 3.

In FIG. 4 and FIG. 5, reference characters F1, F2 and F3 represent respective characteristics of the low-pass filter shown in FIG. 3, phase delay circuit shown in FIG. 2 and phase delay circuit plus low-pass filter shown in FIG. 3.

The low-pass filter (characteristic F1) has a cutoff angular frequency fc $\{=\omega c/(2 \pi C1 \times R1)$: attenuation level 3 dB$\}$ preset to be sufficiently higher than that (30 Hz at maximum) at steering use range, e.g., at 1 KHz, so that noises of 1 KHz and higher frequencies can be removed.

The phase delay circuit (characteristic 2) has a zero-point frequency fs$\{=\omega s/(2 \pi C \times R2)\}$ set, for example, closely to 100 Hz and the level of attenuation set at 6 dB for zero-point frequencies over fs to thereby attenuate noises in this frequency band.

Also, the phase delay circuit (characteristic F2) can be set to produce a phase difference less than $-20°$ so that parasitic oscillations can be prevented.

Since the phase delay circuit plus low-pass filter (characteristic F3) is a combination of characteristic F1 and characteristic F3, the level of attenuation may be set high so that further attenuation of the noises is enabled.

The phase delay circuit plus low-pass filter (characteristic F3) is also designed to provide a phase difference less than $-20$ degrees at a predetermined frequency band (1 KHz), thereby enabling prevention of parasitic oscillations in such frequency band.

At a predetermined frequency band (over 1 KHz), though the phase difference increases in the negative direction, the level of attenuation also gradually increases, whereby the total gain of the control block 12 will become no larger than (can be set at) 1. Accordingly, oscillation conditions will not be met and parasitic oscillations can be prevented.

The control block 20, as explained above, includes the phase compensating device 21 formed of the phase delay circuit or phase delay circuit plus low-pass filter and is thus capable of eliminating high-frequency components from the motor current signals in the feedback loop. As a result, the phase lags of the motor current signals can be suppressed and parasitic oscillations can therefore be prevented.

As explained in detail on basis of the preferred embodiments, according to the invention, the phase compensating device is disposed in a path connecting the motor current detector and the drive controller to enable removal of high-frequency components from the signals in the feedback loop. As a lags, it is possible to suppress the phase turns of the signals and prevent oscillations, leading to provision of steering assist most appropriate for steering operations.

Further, according to the present invention, the phase compensating device is formed of the phase delay circuit, or the phase delay circuit and the low-pass filter connected in series thereto, so that high-frequency components may be removed from the signals in the feedback loop, whereby the phase lags of the signals can be suppressed and the oscillations can be prevented, resulting in the system being simple in construction and capable of producing stable steering assist.

In summary, an electronic power steering system is provided which is adapted to supply steering assist most appropriate for any steering operations, as well as a comfortable steering feel to a driver.

We claim:

1. An electric power steering system for use in an automotive vehicle, comprising:

steering torque sensor means for sensing a steering torque in the steering system, an electric motor for supplying steering assist to the steering system, motor current detector means for detecting current through the electric motor, target current generator means for determining a target current for said electric motor based on a steering torque signal from said steering torque sensor, control means including a drive controller for controlling operations of said electric motor based on the deviation between said target current and said motor current, said drive controller having at least a proportional element and an integral element, and phase compensating means disposed in a path connecting said motor current detector means and said drive controller for reducing undesirable noises and preventing parasitic oscillations.

2. An electric power steering system according to claim 1, wherein said phase compensating means comprises a phase delay means.

3. An electric power steering system according to claim 1, wherein said phase compensating means comprises a phase delay means and a low-pass filter connected in series to said phase delay means.

* * * * *